(12) United States Patent
Takai

(10) Patent No.: US 6,324,593 B1
(45) Date of Patent: Nov. 27, 2001

(54) CONNECTION METHOD AND DEVICE FOR AUXILIARY STORAGE DEVICE

(75) Inventor: Toshikazu Takai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/412,563

(22) Filed: Oct. 5, 1999

(30) Foreign Application Priority Data

Oct. 8, 1998 (JP) .................................................. 10-286768

(51) Int. Cl.[7] .................................................... G06F 3/00
(52) U.S. Cl. ................................. 710/3; 710/13; 703/23
(58) Field of Search .................................. 710/3, 13, 52, 710/129, 130; 703/23, 24

(56) References Cited

U.S. PATENT DOCUMENTS

| | | | |
|---|---|---|---|
| 5,475,836 | * 12/1995 | Harris et al. | .......................... 709/301 |
| 5,522,062 | * 5/1996 | Yamaki | .................................. 711/172 |
| 5,872,940 | * 2/1999 | Circello et al. | ....................... 710/126 |
| 6,012,634 | * 1/2000 | Brogan et al. | ......................... 235/380 |

FOREIGN PATENT DOCUMENTS

| | | |
|---|---|---|
| 6-223026 | 8/1994 | (JP) . |
| 7-141276 | 6/1995 | (JP) . |
| 9-128182 | 5/1997 | (JP) . |
| 9-185460 | 7/1997 | (JP) . |

* cited by examiner

Primary Examiner—Hiep T. Nguyen
(74) Attorney, Agent, or Firm—Young & Thompson

(57) ABSTRACT

When connecting an auxiliary storage device to an information processor by way of an interface, a buffer circuit is provided in the interface that responds to the information processor with the name and type of auxiliary storage device in place of the auxiliary storage device, thereby connecting even when the name of the auxiliary storage device is not recognized by the information processor.

5 Claims, 2 Drawing Sheets

CONNECTION METHOD AND DEVICE FOR AUXILIARY STORAGE DEVICE

BACKGROUND OF THE INVENTION

1. Field of the Invention

The present invention relates to an auxiliary storage device connection method and associated device that allow connection of an unregistered auxiliary storage device to an information processor.

2. Description of the Related Art

Conventionally, when connecting an auxiliary storage device to an information processor, the type and name of the auxiliary storage device are read to verify on the information processor side what type of auxiliary storage device is being connected. This prior art, however, has the following problems: Names of auxiliary storage devices are registered by the information processor, and an auxiliary storage device thus cannot be used if its name does not agree, even if its type agrees with a registered type.

SUMMARY OF THE INVENTION

In view of the above-described problems of the prior art, it is an object of the present invention to provide an auxiliary storage device connection method and associated device that, when connecting an auxiliary storage device to an information processor, allow connection of an auxiliary storage device that is not registered in the information processor.

In order to solve the above-described problems, the auxiliary storage device connection method and associated device according to the present invention provide a buffer circuit in an interface, and this buffer circuit responds to an information processor with the type and name of the auxiliary storage device in place of the auxiliary storage device, thereby enabling connection even when the information processor does not recognize the name of the auxiliary storage device.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Explanation is now presented regarding the embodiments of the present invention with reference to the figures.

Figure 1:
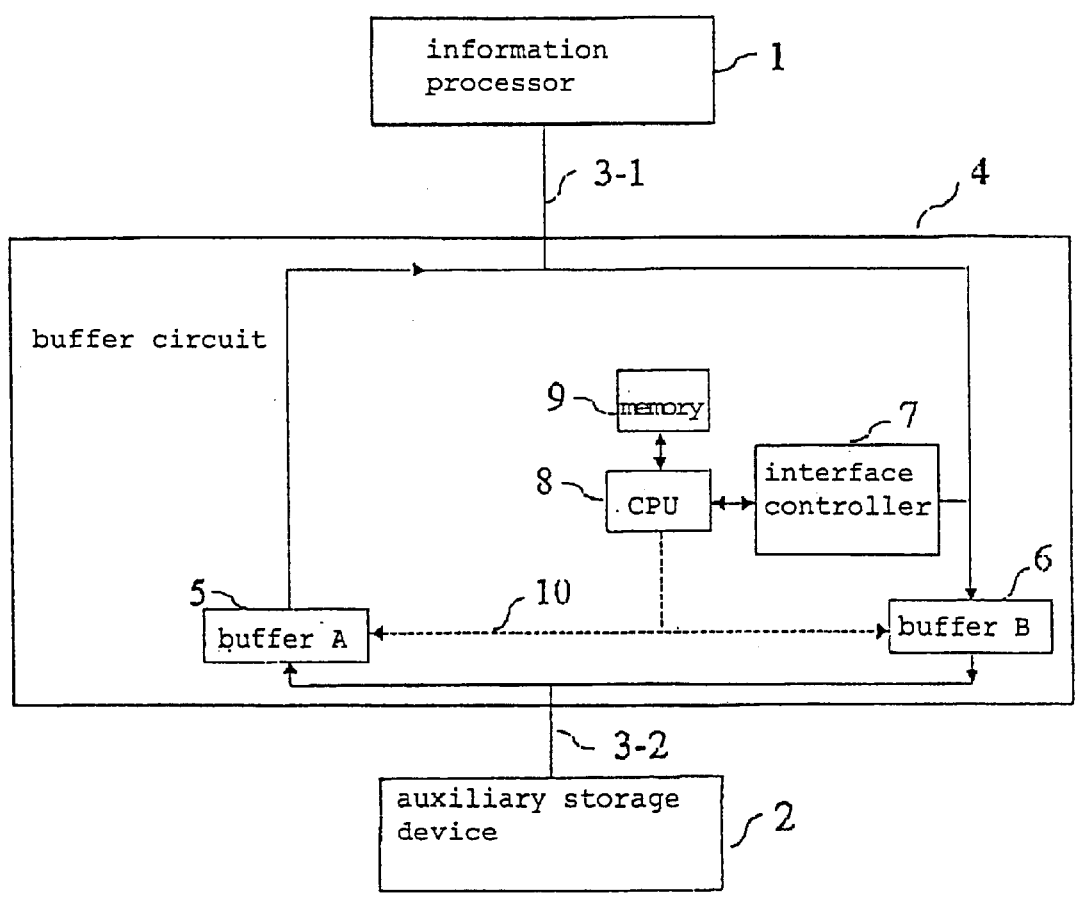
FIG. 1 is a block diagram showing the construction of an embodiment of the present invention.

FIG. 1 is a block diagram showing the construction of an embodiment of the present invention.

In the present embodiment, when information processor 1 is connected to auxiliary storage device 2 by way of interface 3, buffer circuit 4 is connected between information processor 1 and auxiliary storage device 2, as shown in FIG. 1. Interface 3 is thus divided into two parts, interface 3-1 on the information processor 1 side and interface 3-2 on the auxiliary storage device 2 side.

Buffer A 5 and buffer B 6 are provided inside buffer circuit 4 for joining interface 3-1 and interface 3-2, buffer A 5 effecting signal transfer from interface 3-2 to interface 3-1, and buffer B 6 effecting signal transfer from interface 3-1 to interface 3-2. In addition to these buffers, interface controller 7 is connected to interface 3-1, and interface controller 7 is in turn controlled by CPU 8. In addition, CPU 8 is both connected to memory 9 and controls the operation of buffer A 5 and buffer B 6 by means of additional control signal line 10.

In this embodiment, when interface controller 7 within buffer circuit 4 detects a command issued from information processor 1 to auxiliary storage device 2 to verify the type and name of the auxiliary storage device, CPU 8 places buffer A 5 and buffer B 6 in an inactive state and responds to information processor 1 with the type and name of the auxiliary storage device in place of auxiliary storage device 2, thereby enabling connection even in a case in which the auxiliary storage device is not registered in the information processor.

A concrete explanation is next presented regarding the connection operation in this embodiment with reference to FIG. 1.

In normal operation, signals sent to information processor 1 from auxiliary storage device 2 pass by way of interface 3-2, are once stored in buffer A 5, and then are sent to information processor 1 by way of interface 3-1. Signals sent from information processor 1 to auxiliary storage device 2 pass by way of interface 3-1, are once stored in buffer B 6, and then are sent to auxiliary storage device 2 by way of interface 3-2.

This exchange of signals is monitored in interface controller 7 within buffer circuit 4, and the results of. monitoring are sent to CPU 8. When a command from information processor 1 to auxiliary storage device 2 urging the transfer of inquiry data indicating the type and name of auxiliary storage device 2 is recognized by this monitoring operation, CPU 8 both halts the operation of buffer A 5 and buffer B 6 by way of additional control signal line 10 and responds to information processor 1 by means of interface controller 7 with inquiry data that have been stored in memory 9 and that information processor 1 can recognize.

Figure 2:
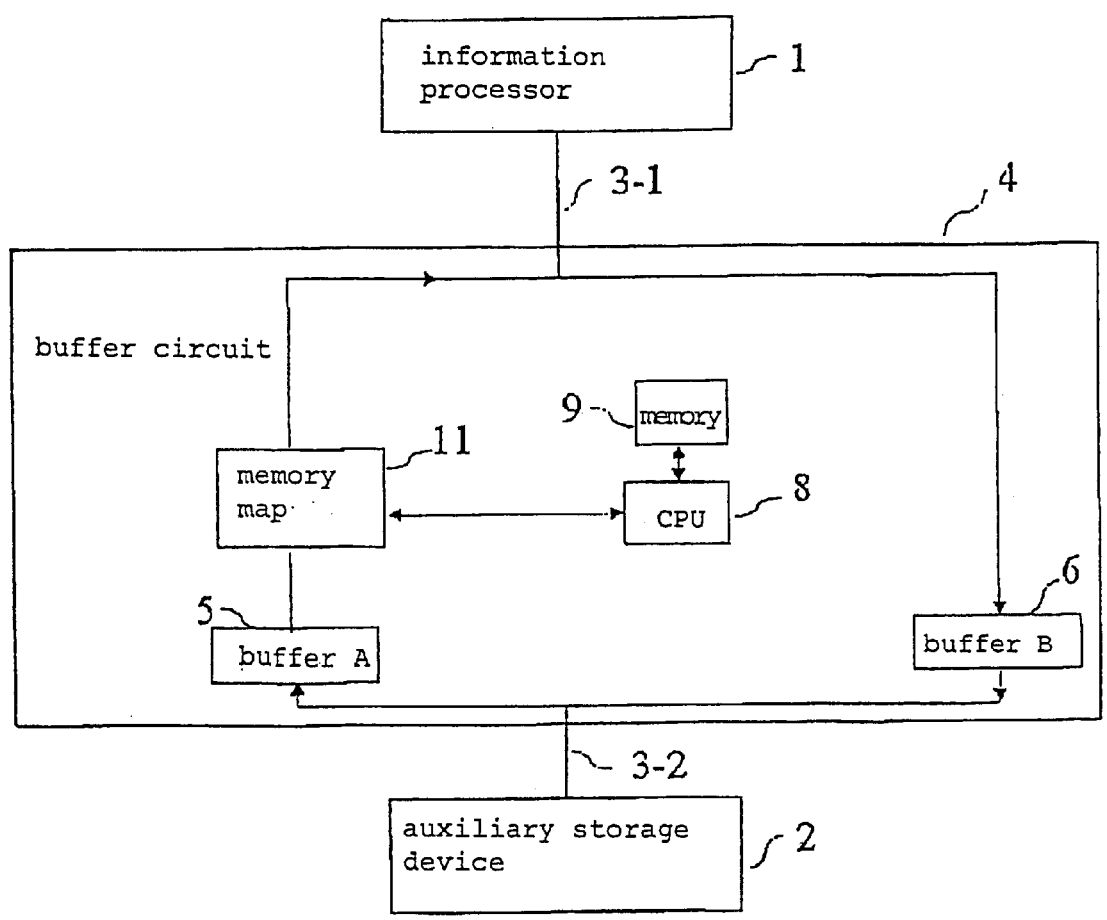
FIG. 2 is a block diagram showing the construction of another embodiment of the present invention.

Explanation is next presented regarding another embodiment of this invention with reference to the FIG. 2.

FIG. 2 is a block diagram showing the construction in another embodiment of the present invention. As shown in FIG. 2, this embodiment replaces the above-described interface controller with a combination of a memory map and CPU.

Inside buffer circuit 4, buffer A 5 and memory map 11, as well as buffer B 6 are provided to join interface 3-1 and interface 3-2, buffer A 5 and memory map 11 effecting signal transfer from interface 3-2 to interface 3-1, and buffer B 6 effecting signal transfer from interface 3-1 to interface 3-2. Memory map 11 is controlled by CPU 8, and CPU 8 is further connected to, memory 9.

Explanation is next presented regarding a concrete example of the connection operation of this embodiment with reference to the FIG. 2.

Signals sent from auxiliary storage device 2 to information processor 1 are expanded in memory map 11. CPU 8 analyzes signals stored in memory map 11, and if, by this process, CPU 8 recognizes these signals as inquiry data in advance, CPU 8 rewrites the inquiry data on the memory map. This rewriting is carried out using a table that is maintained in memory 9. The data after this rewriting are sent to information processor 1 as the inquiry data in place of auxiliary storage device 2.

By first responding with the content of the rewriting of memory 9 from CPU 8 in place of the auxiliary storage device in the event of a request from information processor 1 to connect to auxiliary storage device 2, information processor 1 can recognize a specific auxiliary storage device 2 as a predetermined auxiliary storage device.

As described in the foregoing explanation, the present invention has the merit of enabling connection even in the case of an auxiliary storage device that is not recognized as a device capable of connection by an information processor by having a buffer circuit respond with inquiry data that the information processor can recognize in place of the auxiliary storage device.

While preferred embodiments of the present invention have been described using specific terms, such description is for illustrative purposes only, and it is to be understood that changes and variations may be made without departing from the spirit or scope of the following claims.

What is claimed is:

1. An auxiliary storage device connection method for enabling connection even when a name of an auxiliary storage device is not recognized by an information processor, comprising the steps of:

providing a buffer circuit in an interface when connecting said auxiliary storage device to said information processor by way of said interface; and responding by said buffer circuit to said information processor with a type and said name of said auxiliary storage device in place of said auxiliary storage device.

2. A connection device for an auxiliary storage device for connecting said auxiliary storage device to an information processor, said connection device being a buffer circuit that is connected to an information processor-side interface connected to said information processor and an auxiliary storage device-side interface connected to said auxiliary storage device; said buffer circuit comprising:

a buffer for effecting signal transfer from said auxiliary storage device-side interface to said information processor-side interface;

a buffer for effecting signal transfer from said information processor-side interface to said auxiliary storage device-side interface;

an interface controller connected to said information processor-side interface;

a CPU connected to said interface controller;

a memory connected to said CPU; and an additional control signal line connecting said CPU to each of said two buffers whereby CPU controls an operation of said two buffers.

3. A connection device for an auxiliary storage device according to claim 2 wherein:

said interface controller detects a command issued from said information processor to said auxiliary storage device for verifying a type and name of said auxiliary storage device; and upon detection, said CPU places both of said two buffers in an inactive state and responds to said information processor with the type and name of an auxiliary storage device in place of said auxiliary storage device.

4. A connection device for an auxiliary storage device according to claim 2, wherein said memory stores types and names of auxiliary storage devices for responding to an information processor.

5. A connection device for an auxiliary storage device for connecting said auxiliary storage device to an information processor, said connection device being a buffer circuit that is connected to an information processor-side interface connected to said information processor and an auxiliary storage device-side interface connected to said auxiliary storage device; said buffer circuit comprising:

a buffer and memory map for effecting signal transfer from said auxiliary storage device-side interface to said information processor-side interface;

a buffer for effecting signal transfer from said information processor-side interface to said auxiliary storage device-side interface;

a CPU for analyzing and rewriting data stored in said memory map; and a memory connected to said CPU.

\* \* \* \* \*